(12) United States Patent
Payne

(10) Patent No.: US 11,213,148 B1
(45) Date of Patent: Jan. 4, 2022

(54) CAKE PROTECTOR

(71) Applicant: Cicely Payne, Mattapan, MA (US)

(72) Inventor: Cicely Payne, Mattapan, MA (US)

( * ) Notice: Subject to any disclaimer, the term of this patent is extended or adjusted under 35 U.S.C. 154(b) by 0 days.

(21) Appl. No.: 17/249,004

(22) Filed: Feb. 17, 2021

(51) Int. Cl.
*A47G 19/26* (2006.01)
*A47J 47/10* (2006.01)

(52) U.S. Cl.
CPC .............. *A47G 19/26* (2013.01); *A47J 47/10* (2013.01); *A47G 2400/061* (2013.01)

(58) Field of Classification Search
CPC ........ B65D 25/10; A47G 19/02; A47G 19/00; A47G 2400/061; A21D 13/80; F21V 35/00; F21V 35/006; F21V 35/003; F21W 2121/002
USPC ........................................................ 99/645
See application file for complete search history.

(56) References Cited

U.S. PATENT DOCUMENTS

| | | | | |
|---|---|---|---|---|
| 1,125,855 | A * | 1/1915 | Mapes | A47G 19/26 312/284 |
| 2,758,458 | A | 8/1956 | Carlson | |
| 2,852,054 | A * | 9/1958 | Murat | B65D 43/162 220/834 |
| 3,819,455 | A | 6/1974 | Mackendrick | |
| 4,884,966 | A | 12/1989 | Wexler | |
| 4,938,688 | A | 7/1990 | Wexler | |
| D625,565 | S * | 10/2010 | Alford | D7/610 |
| 8,215,480 | B2 * | 7/2012 | Qian | B01L 9/06 206/45.2 |
| 8,668,088 | B2 * | 3/2014 | Donnelly | A47G 19/26 206/457 |
| 9,402,490 | B2 | 8/2016 | Johnson | |
| 10,039,398 | B1 | 8/2018 | Daneshvar | |
| 10,463,180 | B1 | 11/2019 | Donnelly et al. | |
| 2003/0136277 | A1 | 7/2003 | Okros | |
| 2004/0224271 | A1 | 11/2004 | Langsam | |
| 2004/0244604 | A1 | 12/2004 | Slagter | |
| 2007/0048280 | A1 | 3/2007 | Cartledge et al. | |
| 2012/0167784 | A1 | 7/2012 | Zeigler et al. | |

\* cited by examiner

*Primary Examiner* — Steven A. Reynolds
*Assistant Examiner* — Javier A Pagan
(74) *Attorney, Agent, or Firm* — Altman & Martin; Steven K Martin

(57) ABSTRACT

A cake protector with cake region defined by a vertical cake region wall resting on the surface and a horizontal cover. A candle region above the cover is defined by the cover and a candle region wall. In one configuration, the cake region wall, cover, and candle region wall are a unitary component. In another configuration, the cake region wall is a unitary component, and the cover and candle region wall is a separate unitary component that sits in an annular groove in the top of the cake region wall. A lid is attached to the candle region wall by a hinge such that the lid pivots between an open position, where the lid allows access to the candle region, and a closed position, where the lid encloses the candle region. The hinge is detachable or not. The lid has holes for candles that rest on the cover.

5 Claims, 7 Drawing Sheets

CAKE PROTECTOR

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to cake covers, more particularly, to covers that protect the cake and hold candles.

2. Description of the Related Art

A traditional practice associated with birthdays is blowing out candles on a birthday cake. When the celebrant blows out the candles, microscopic droplets of saliva and other contents of the mouth end up on the cake, a most unsanitary condition. Further, as the candles melt, they deposit wax on the cake.

BRIEF SUMMARY OF THE INVENTION

The present invention is a cake protector that shields a cake or other baked confection from saliva and food particles. The protector has a cake region defined by a single vertical cake region wall. The bottom edge of the cake region wall rests on the surface on which the cake sits. Optionally, that surface is a tray with an optional mechanism for securing the cake region wall to the tray. A horizontal cover is on top of the cake region wall and fully encloses the cake region. A candle region is above the cover and defined by the cover as the floor and a single candle region wall extending upwardly from and around the entire perimeter of the cover. A horizontal lid sits on the candle region wall, fully enclosing the candle region.

In a first configuration of the cake protector, the cake region wall, cover, and candle region wall are a unitary component. In a second configuration, the cake region wall is a unitary component, and the cover and candle region wall is a separate unitary component. The cover sits within an annular groove in the top of the cake region wall.

The lid is attached to the top edge of the candle region wall by a hinge that allows the lid to pivot between an open position, where the lid is at least vertical to allow access to the candle region, and a closed position, where the lid sits on top of the candle region wall or in an annular groove on the top of the wall.

In one configuration, the hinge is detachable, many of which are known in the art and can be employed. In one example, the outer bearing surface of the hinge is a cylinder is attached horizontally to the top edge of the candle region wall and the inner bearing surface is a tubular groove in the edge of the lid. A slot in the wall of the groove extends just over 180° of the circumference of the groove, giving the groove a C shape in cross-section. In a snap configuration, the cylinder has a round cross-section and the hinge is assembled by pushing the slot onto the cylinder until it snaps together. In an eccentric configuration, the cylinder has an oval cross-section. The hinge is assembled by aligning the slot with the narrow portion of the cylinder and installing the groove over the cylinder. When the lid is pivoted about the cylinder, the slot no longer aligns with the narrow portion and the cylinder is captured within the groove, thereby attaching the lid.

In another configuration, the hinge is not detachable. Any adequate nondetachable hinge structure can be employed. One example is a living hinge.

The lid has vertical through holes for candles or other decorations. The candles or decorations extend through the holes and rest on the cover. In one configuration, the lid includes holes of a variety of sizes to accommodate candles of different sizes. In another configuration, there are several different lids, each with holes that are the same size. The appropriate lid is used for the size of the candles. Optionally, the cover has cups vertically aligned with the holes to aid in holding the candles vertical and/or stable.

An optional element for the cake protector 10 is an extension that extends the area of the lid to add more candles or other decorations. The extension has essentially the same construction as the combination of cover, lid, and candle region wall of the configuration where the cover and candle region wall is a unitary component. The extension is attached to the protector by a flange extending from the extension wall that overlaps a flange extending from the candle region wall, with fasteners extending through holes in the flanges. An optional brace keeps the extension lid aligned with the protector lid.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention is a cake protector 10 that shields a cake or other baked confection from saliva and food particles. The term, cake, is used to refer to the food item that is to be protected by the cake protector 10.

The protector 10, shown in FIGS. 1-5, has a cake region 11 defined by a generally vertical cake region wall 12. The cake region wall 12 is a single wall that surrounds the cake region 11. The cake region wall 12 can be any desired size and shape. The cake region wall 12 can be vertical, as in FIG. 3, can angle inwardly, as in FIG. 5, or can undulate with various curves as it rises. The phrase, "generally vertical," with reference to the cake region wall 12 is intended to encompass all of these possibilities.

The length, width, and height of the cake region wall 12 are determined by the largest cake 2 for which the protector 10 is intended. The shape of the cake region wall 12 does not have to match that of the cake 2. However, for esthetic reasons, it is preferred that the cake region wall 12 be approximately the same shape as the cake 2. For example, if the cake 2 is round, it is preferred that the cake region wall 12 be round, as in FIG. 1. If the cake 2 is rectangular, it is preferred that the cake region wall 12 be rectangular, as in FIG. 2.

Figure 1:
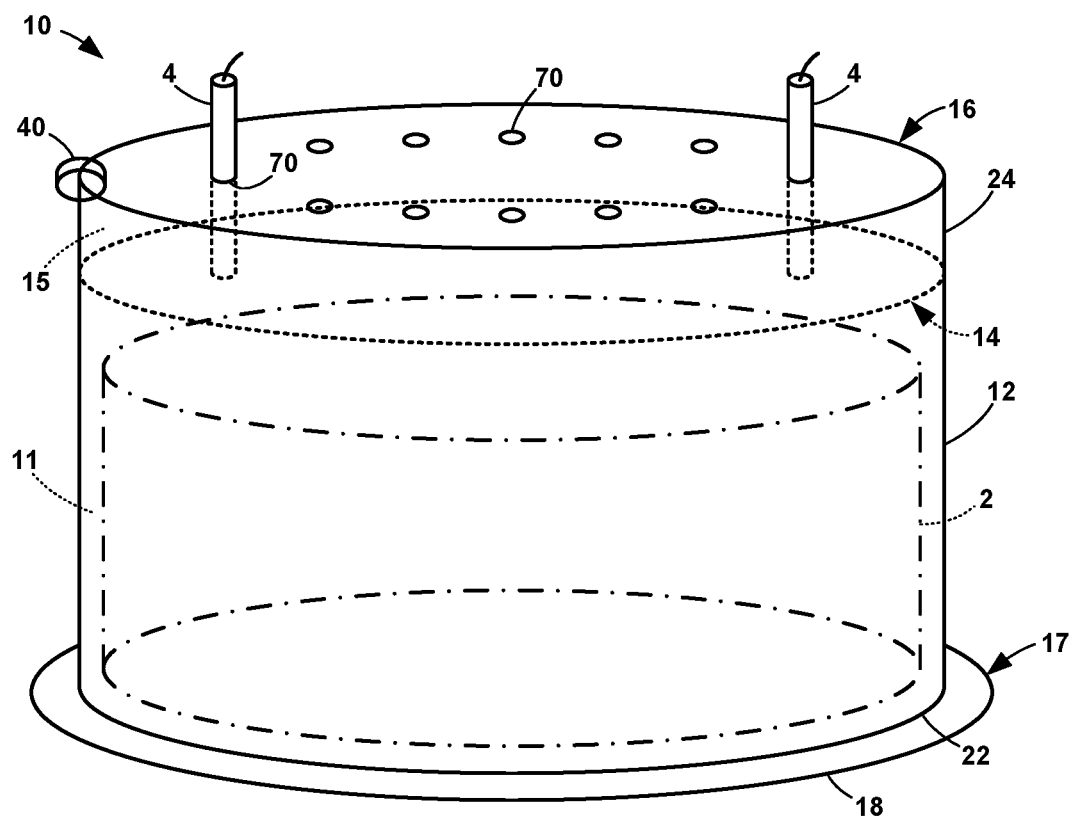
FIG. 1 is a perspective view of the cake protector of the present invention for a round cake.

The bottom edge 22 of the cake region wall 12 rests on the surface 17 on which the cake 2 sits. Optionally, that surface 17 is a tray 18, as shown in FIG. 1. Optionally, the tray 18 and cake region wall 12 include a locking mechanism to secure the cake region wall 12 to the tray 18. There are a number of such mechanisms known in the art, and any such mechanism can be employed by the cake protector 10 of the present invention. In an example of such a mechanism, a plurality of annular flanges on and spaced around the circumference of the bottom edge 22 of the cake region wall 12 are rotated into grooves on the tray 18. In another example mechanism, a flange on the bottom edge 22 of the enclosure snaps into a groove in the tray 18. An arm on the top of the groove can be pushed downwardly to release the flange.

A generally horizontal cover 14 is on top of the cake region wall 12, fully enclosing the cake region 11. In the illustrated configurations, the cover 14 is flat. However, the present invention contemplates that the cover 14 can be convex so that the cake region 11 is domed. The phrase, "generally horizontal," is intended to include a domed cover 14.

The protector 10 has a candle region 15 above the cover 14 defined by the cover 14 as the floor and a candle region wall 24 extending upwardly from and around the entire perimeter of the cover 14. The candle region wall 24 is a single wall that surrounds the candle region 15. As with the cake region wall 12, the candle region wall 24 can be vertical, can angle inwardly or outwardly, or can undulate with various curves as it rises. The phrase, "generally vertical," with reference to the candle region wall 24 is intended to encompass all of these possibilities.

Figure 2:
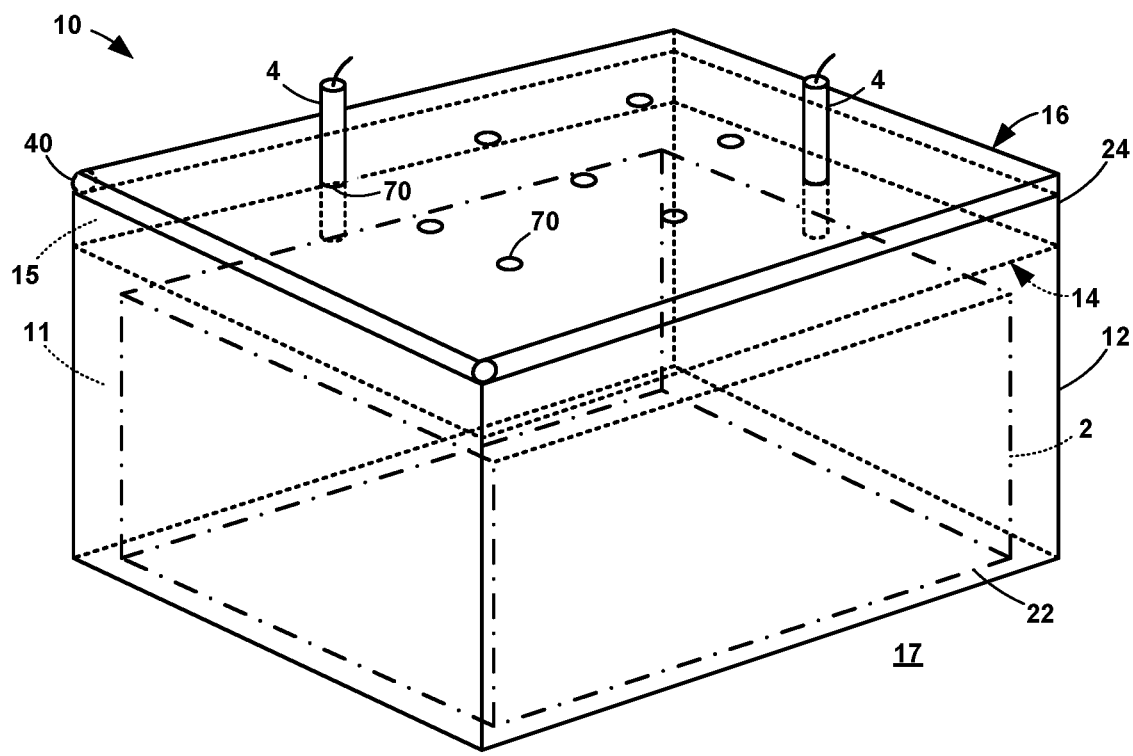
FIG. 2 is a perspective view of the cake protector of the present invention for a rectangular cake.

The candle region wall 24 has the same perimeter shape as the cake region wall 12, i.e., if the cake region wall 12 is round, the candle region wall 24 is round, as in FIG. 1, and if the cake region wall 12 is rectangular, the candle region wall 24 is rectangular, as in FIG. 2.

A generally horizontal lid 16 sits on the top edge 26 of the candle region wall 24, fully enclosing the candle region 15.

The present invention contemplates different configurations of the protector 10.

Figure 3:
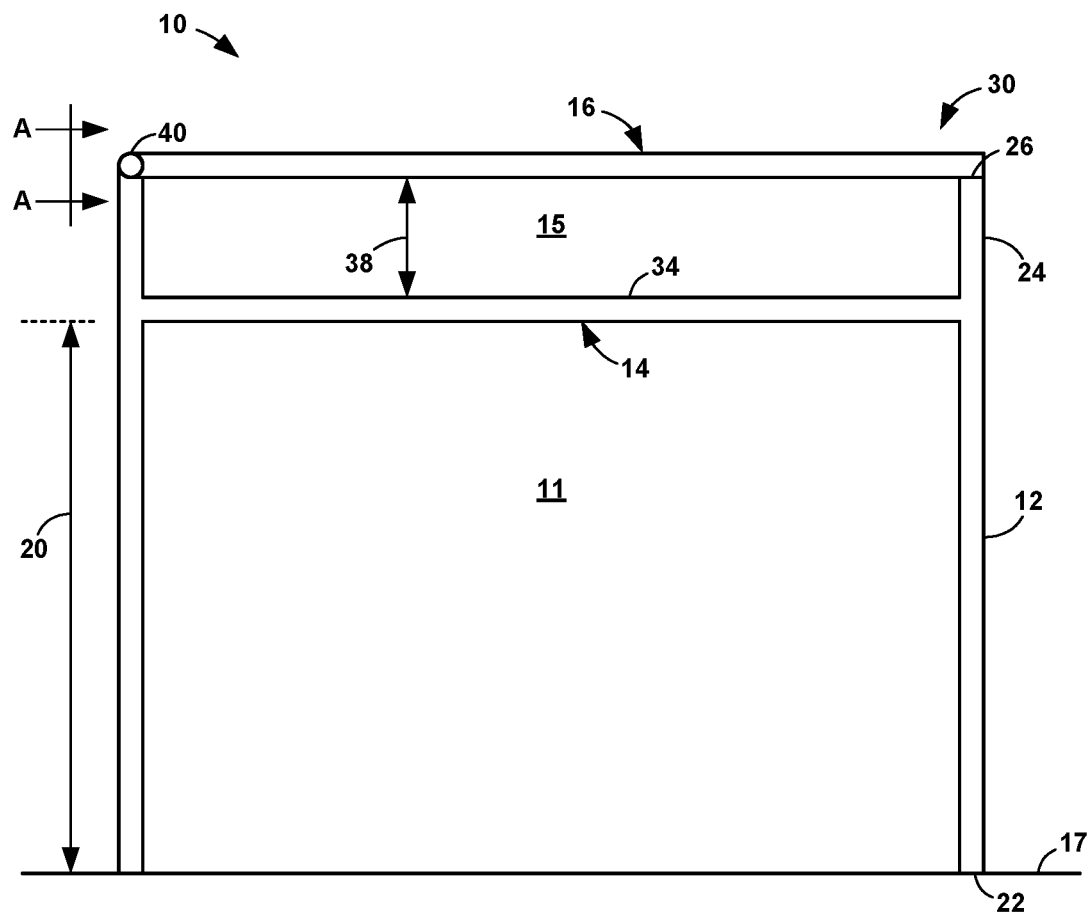
FIG. 3 is a cross-sectional side view of the cake protector with a unitary cover and a first configuration of the lid and enclosure top edge in the closed position.
Figure 4:
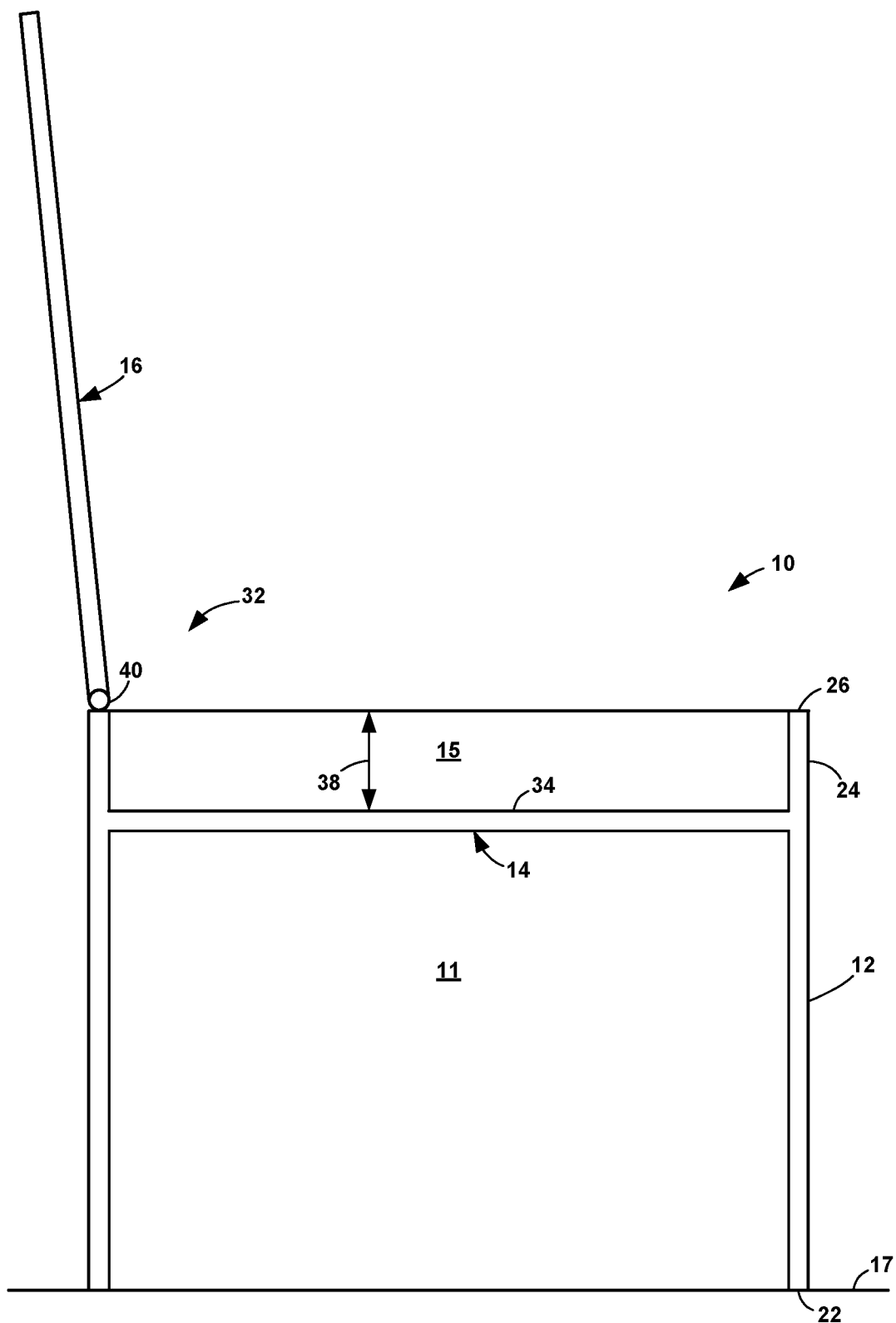
FIG. 4 is a cross-sectional side view of the cake protector with a unitary cover and the first configuration of the lid and enclosure top edge in the open position.

In a first configuration, shown in FIGS. 3 and 4, the cake region wall 12, the cover 14, and the candle region wall 24 are a unitary component. In this configuration, the cake region wall 12, the cover 14, and the candle region wall 24 may be formed from a single mold.

Figure 5:
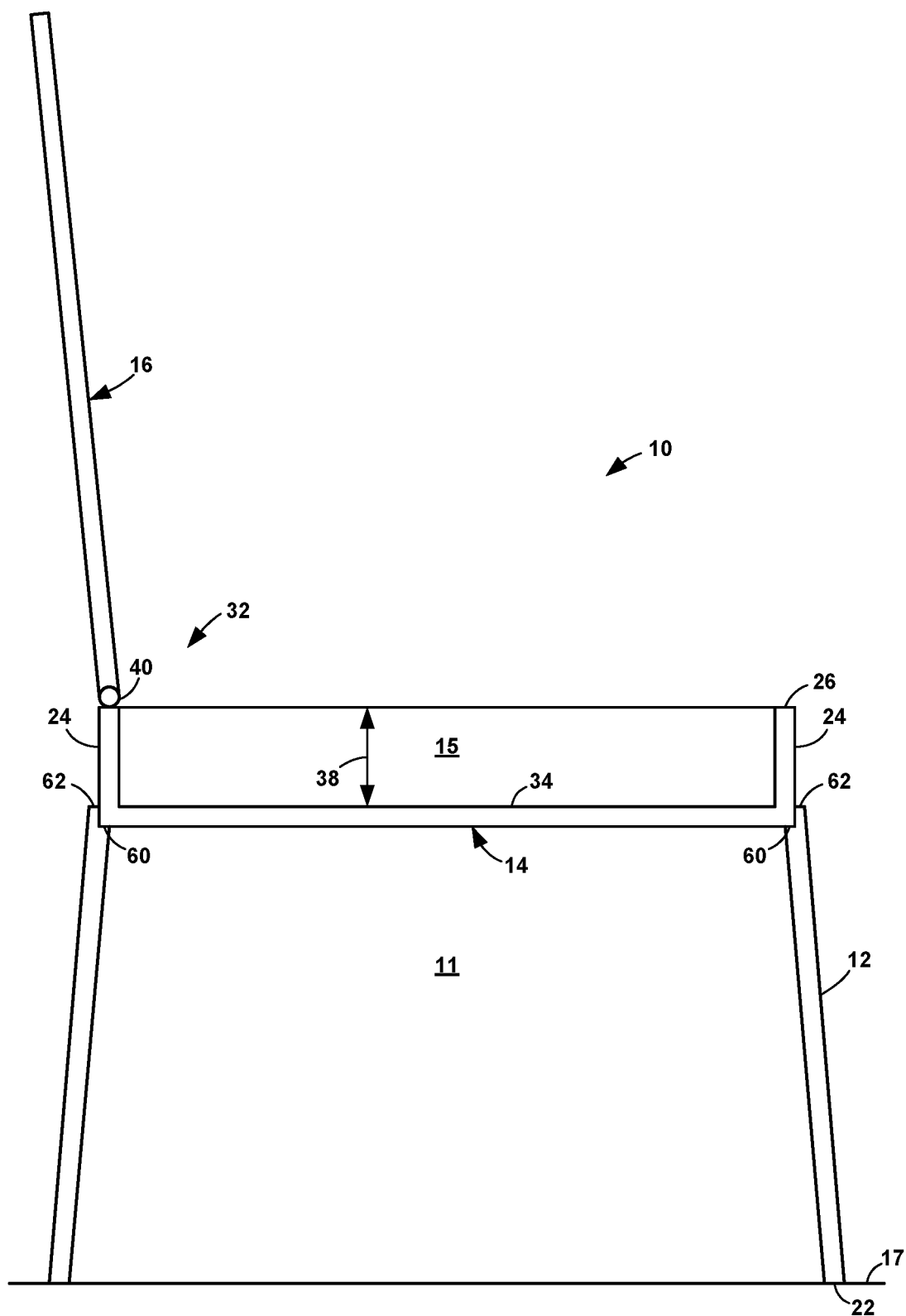
FIG. 5 is a cross-sectional side view of the cake protector with a removable cover and the first configuration of the lid and enclosure top edge in the open position.

In a second configuration of the protector 10, shown in FIG. 5, the cake region wall 12 is a unitary component and the cover 14 and candle region wall 24 is a separate unitary component. The cover 14 is sized to sit within an annular groove 60 in the cake region wall top edge 62.

The lid 16 is attached to the top edge 26 of the candle region wall 24 by a hinge 40. The hinge 40 allows the lid 16 to pivot between an open position 32 and a closed position 30. In the open position 32, the lid 16 can be pivoted to at least vertical to provide access to the top surface 34 of the cover 14, as in FIGS. 4 and 5. Access to the cover 14 facilitates cleaning of the cover 14, particularly from melted wax.

Figure 6:
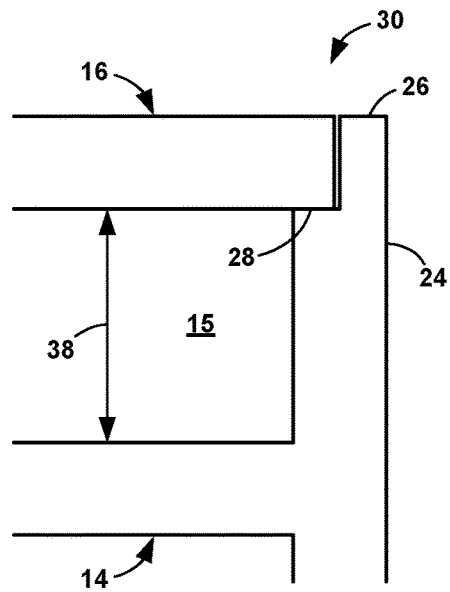
FIG. 6 is a cross-sectional, detail view of a second configuration of the lid and enclosure top edge in the closed position.

When in the closed position 30, the lid 16 sits on the top edge 26 of the candle region wall 24. The lid 16 is sized to rest on the candle region wall top edge 26, as in FIG. 3, or to rest within an annular groove 28 in the candle region wall top edge 26, as in FIG. 6.

The height of the gap 38 between the cover 14 and lid 16 is determined by the closed position 30 of the lid 16. The gap height is either the height of the candle region wall 24 from the cover 14, as in FIG. 3, or the distance between the bottom of the groove 28 and the cover 14, as in FIG. 6. The height of the gap 38 will typically, be in the range of about 0.5" to 1".

Figure 7:
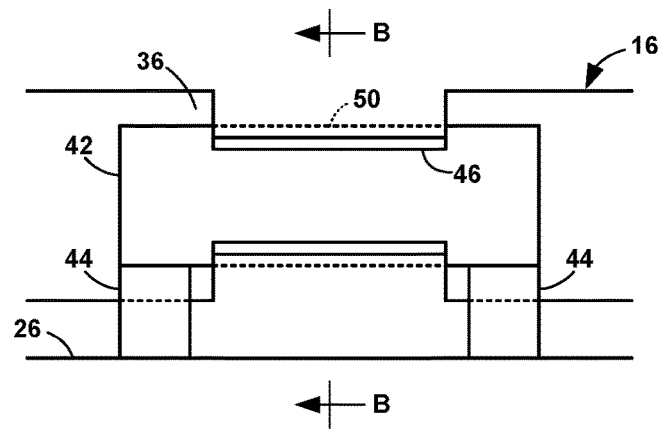
FIG. 7 is a side view of a configuration of the hinge taken at A-A of FIG. 3.

In one configuration, the hinge 40 is detachable. Detachable hinges are well-known in the art and the present invention contemplates that any adequate detachable hinge structure can be employed. In an example of such a hinge 40, shown in FIGS. 7-9, a cylinder 42 is attached horizontally to the candle region wall top edge 26 by a pair of arms 44. The surface 50 of the cylinder 42 operates as a convex bearing surface. The edge 36 of the lid 16 has a tubular groove 46, the inner surface 52 of which operates as a concave bearing surface. A slot 48 in the wall of the groove 46 extends between the ends of the groove 46 and around just over 180° of the circumference of the groove 46, giving the groove 46 a C shape in cross-section, as in FIGS. 8 and 9.

Figure 8:
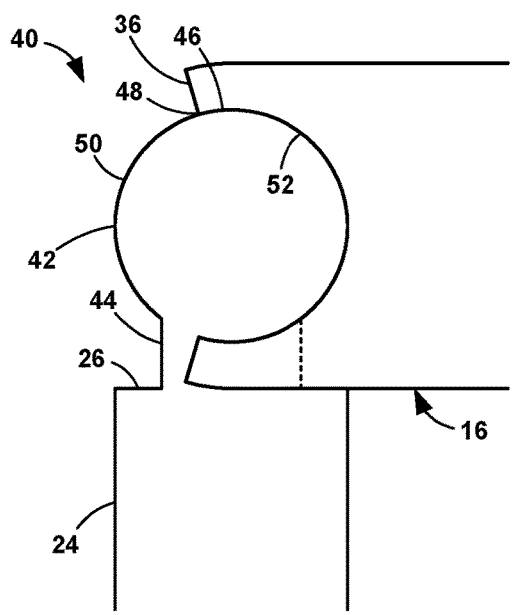
FIG. 8 is a cross-sectional end view of the snap configuration of the hinge taken at B-B of FIG. 7.

In a snap configuration, shown in FIG. 8, the cylinder 42 has a round cross-section. The hinge 40 is assembled by pushing the slot 48 onto the cylinder 42. The lid material is slightly flexible so the slot 48 expands to the diameter of the cylinder 42 as it is being pushed onto the cylinder 42. Once the cylinder 42 has passed into the groove 46, the groove 46 resumes its quiescent shape, thereby attaching the lid 16 to the candle region wall 24. The groove 46 pivots about the cylinder 42. To remove the lid 16, the groove 46 is pulled away from the cylinder 42 through the slot 48.

Figure 9:
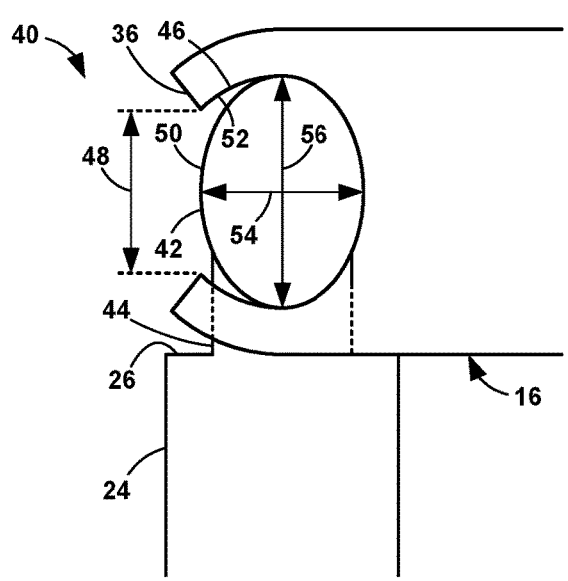
FIG. 9 is a cross-sectional end view of the eccentric configuration of the hinge taken at B-B of FIG. 7.

In an eccentric configuration, shown in FIG. 9, the cylinder 42 has an oval cross-section. The narrow portion 54 is small enough to fit into the slot 48 and the wide portion 56 is the same as the diameter of the inner surface 52 of the groove 46. The hinge 40 is assembled by aligning the slot 48 with the narrow portion 54 and installing the groove 46 over the cylinder 42. When the lid 16 is pivoted about the cylinder 42 and the slot 48 no longer aligns with the narrow portion 50, the cylinder 42 is captured within the groove 46 and the lid 16 is attached to the candle region wall 24. To remove the lid 16, the lid 16 is pivoted until the slot 48 is aligned with the narrow portion 54 and the groove 46 is pulled away from the cylinder 42 through the slot 48.

Figure 10:
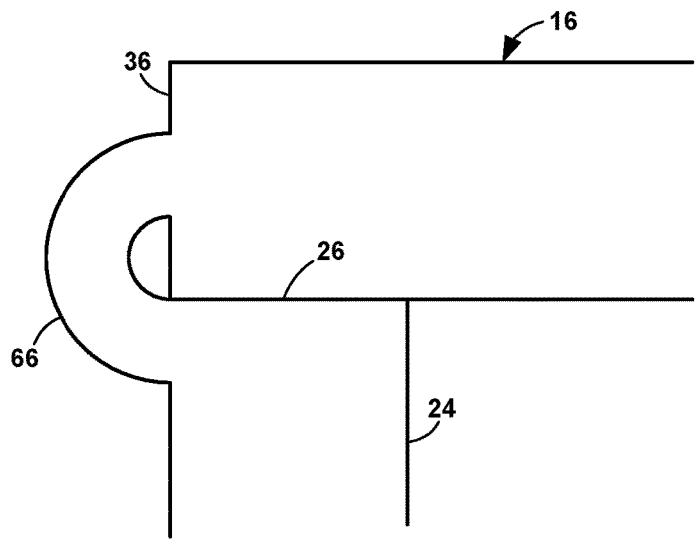
FIG. 10 is a cross-sectional end view of the living hinge configuration.

In another configuration, the hinge 40 is not detachable. Any adequate nondetachable hinge structure can be employed. One example is a living hinge where the candle region wall 24 and lid 16 are connected by a thin sheet 66 of the same material from which they are made, as in FIG. 10. The sheet 66 extends from the outside of the candle region wall 24 to the edge 36 of the lid 16. The hinge sheet 66 is thin enough that it bends easily but does not break.

The lid 16 has vertical through holes 70 for candles 4 or other decorations. The candles 4 or decorations extend through the holes 70 and rest on the cover 14.

If the holes 70 are sized to accommodate candles 4 of most sizes, the holes 70 would be relatively large and smaller candles 4 would lean at an angle rather than standing vertically. Depending on the sizes of the hole 70, candle 4, and the gap 38 between the cover 14 and lid 16, the angle of lean can be substantial. The present invention contemplates several different configurations for solving this problem.

In one configuration, the lid 16 includes holes 70 of a variety of sizes to accommodate candles 4 of different sizes. This configuration will only work for a small number of candles 4 of the same size.

In another configuration, there are several different lids 16. All of the holes 70 in a lid 16 are the same size and each lid 16 has different size holes 70. In all the configurations of the protector 10 described above, the lid 16 is replaceable. When candles 4 of a different size are to be used, the lid 16 is replaced by one with holes 70 of the appropriate size.

Figure 11:
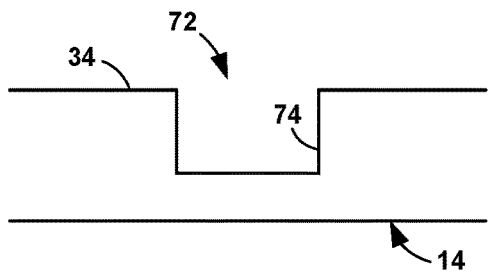
FIG. 11 is a cross-sectional side view of an internal cylindrical cup.
Figure 12:
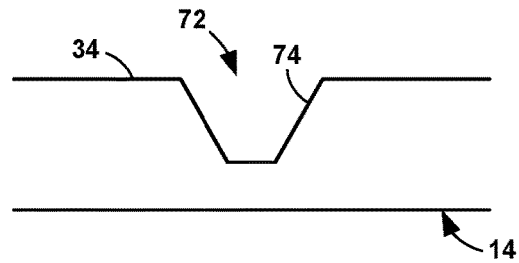
FIG. 12 is a cross-sectional side view of an internal conical cup.
Figure 13:
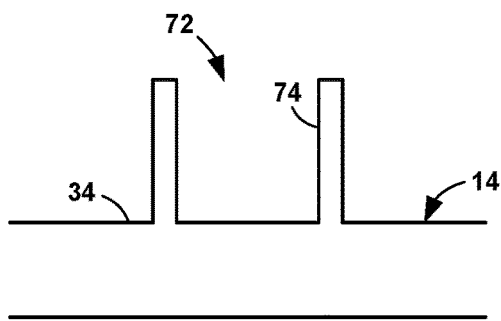
FIG. 13 is a cross-sectional side view of an external cylindrical cup.
Figure 14:
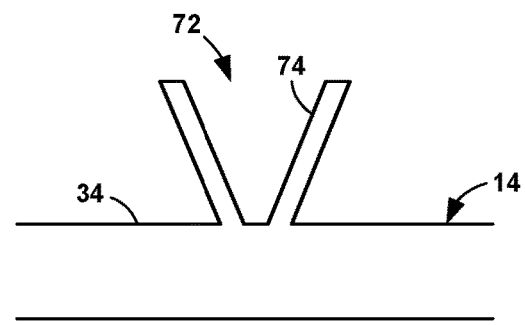
FIG. 14 is a cross-sectional side view of an external conical cup.

Optionally, the cover 14 has cups 72 vertically aligned with the holes 70 to aid in holding the candles 4 vertical and/or stable. The cups 72 can be depressions in the cover top surface 34, as in FIGS. 11 and 12, or can be on top of the cover top surface 34, as in FIGS. 13 and 14. The inside 74 of the cups 72 can be cylindrical, as in FIGS. 11 and 13, or conical, as in FIGS. 12 and 14. The conical cups are self-centering, that is, the candle 4 will be centered in the cup 72.

Figure 15:
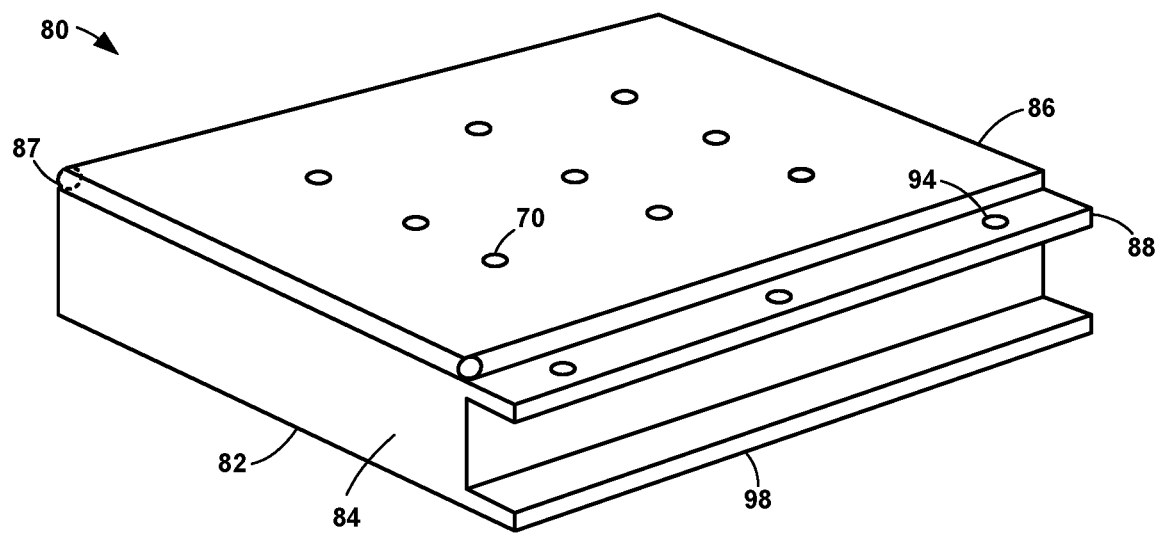
FIG. 15 is a perspective view of the cake protector extension.

An optional element for the cake protector 10 is an extension 80, shown in FIG. 15. The extension 80 extends the area of the lid 16 in order to add more candles or other decorations to the protector 10. The extension 80 has essentially the same construction as the configuration of the cover 14, lid 16, and candle region wall 24 of FIG. 5. An extension floor 82 provides the base for the candles 4. An extension wall 84 encloses the extension 80. An extension lid 86 covers the extension 80 and is attached to the extension wall 84 by a hinge 87 having the same structure as the lid hinge 40.

Figure 16:
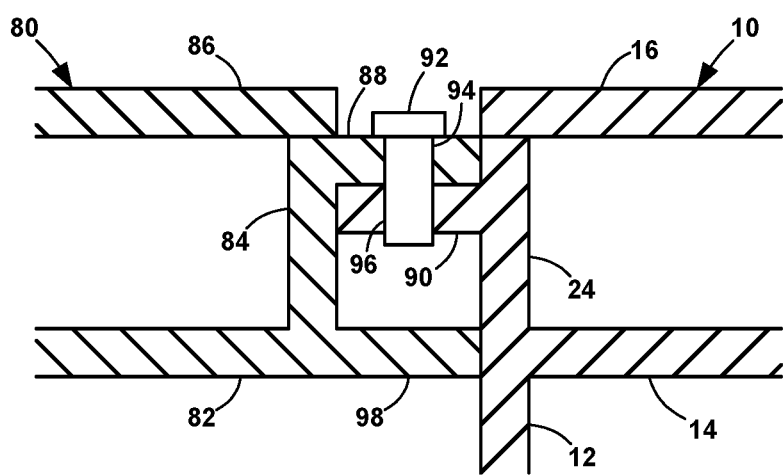
FIG. 16 is a side view of the extension attached to the cake protector.

As seen in FIG. 16, the extension 80 is attached to the protector 10 by a pair of flanges and a fastener. A flange 88 extends perpendicularly from the extension wall 84 and overlaps a flange 90 extending perpendicularly from the candle region wall 24. One or more fasteners 92 extend through holes 94 in the extension flange 88 and holes 96 in the protector flange 90. The fasteners 92 can take whatever form is appropriate, such as threaded fasteners or press-fit fasteners.

An optional extension brace 98 extends perpendicularly from the bottom of the extension wall 84. The brace 98 abuts the candle region wall 24 to keep the extension lid 86 aligned with the protector lid 16.

The components are composed of a substantially rigid plastic that is preferably clear. Optionally, all or some of the components are tinted. Preferably, the plastic is resistant to fire from the candles in the event that that the candle is allowed to burn too long. The optional tray 18 is also composed of a substantially rigid plastic and has no color preference.

Thus, it has been shown and described a cake protector. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A cake protector comprising:
    (a) a generally vertical cake region wall adapted to sit on a horizontal surface and defining a cake region;
    (b) a generally horizontal cover on top of the cake region wall enclosing the cake region;
    (c) a generally vertical candle region wall extending upwardly from the cover and defining a candle region above the cover;
    (d) a lid attached to the candle region wall by a living hinge, the lid having a closed position wherein the lid is sitting on the candle region wall, thereby enclosing the candle region, and the lid having an open position wherein the candle region is accessible; and
    (e) a plurality of through holes in the lid.

2. The cake protector of claim 1 wherein the cake region wall, cover, and candle region wall are a unitary component.

3. The cake protector of claim 1 wherein the cake region wall has an upper edge with an annular groove, the cover and candle region wall are a unitary component, and the cover sits within the annular groove.

4. The cake protector of claim 1 wherein the horizontal surface is on a tray.

5. The cake protector of claim 1 wherein the cover has cups aligned with the through holes.

* * * * *